United States Patent
Whelan

[11] Patent Number: 6,086,093
[45] Date of Patent: Jul. 11, 2000

[54] AIR BAG ACTIVATING SYSTEM AND A STRAIN RELIEF SLEEVE THEREFOR

[75] Inventor: Michael Joseph Gerard Whelan, Bedfordshire, United Kingdom

[73] Assignee: The Whitaker Corporation, Wilmington, Del.

[21] Appl. No.: 09/077,551

[22] PCT Filed: Dec. 4, 1996

[86] PCT No.: PCT/IB96/01354

§ 371 Date: Jun. 1, 1998

§ 102(e) Date: Jun. 1, 1998

[87] PCT Pub. No.: WO97/20711

PCT Pub. Date: Jun. 12, 1997

[30] Foreign Application Priority Data

Dec. 5, 1995 [GB] United Kingdom .................. 9524905

[51] Int. Cl.[7] .................................................. B60R 21/16
[52] U.S. Cl. .......................................... 280/731; 280/735
[58] Field of Search .............................. 280/731, 728.2; 174/113 R, 59, 113 C, 117 R, 74 R; 156/55; 439/445–448

[56] References Cited

U.S. PATENT DOCUMENTS

| | | | |
|---|---|---|---|
| 2,434,793 | 1/1948 | Feaster | 174/113 |
| 3,395,244 | 7/1968 | Koehler | 174/135 |
| 4,758,685 | 7/1988 | Pote et al. | 174/29 |
| 5,380,224 | 1/1995 | DiCicco | 439/610 |
| 5,794,969 | 8/1998 | Sakane | 280/731 |
| 5,823,817 | 10/1998 | Pyle | 439/447 |

FOREIGN PATENT DOCUMENTS

| | | |
|---|---|---|
| 0 444 584 A2 | 9/1991 | European Pat. Off. . |
| 1 034 732 | 7/1958 | Germany . |
| 42 01 390 A1 | 7/1993 | Germany . |
| 2 222 436 | 2/1990 | United Kingdom . |

*Primary Examiner*—Brian L. Johnson
*Assistant Examiner*—Tony Winner

[57] ABSTRACT

A stiffly extensible strain relief sleeve (24), in order to protect the crimped connections (27) between the conductors and the terminals (28) when the connector has been unmated from the activating assembly (19) and is accidentally pulled, fixed to a clock spring cassette (6) and a connector (18). The sleeve (24) has a passage (26) which is oversized with respect to the lead portion (16) and through which the lead portion (16) extends freely. When the connector (18) is pulled, the sleeve (24) elongates slightly and cable is drawn from a wave 168 formed therein to compensate for the elongation of the sleeve (24).

4 Claims, 5 Drawing Sheets

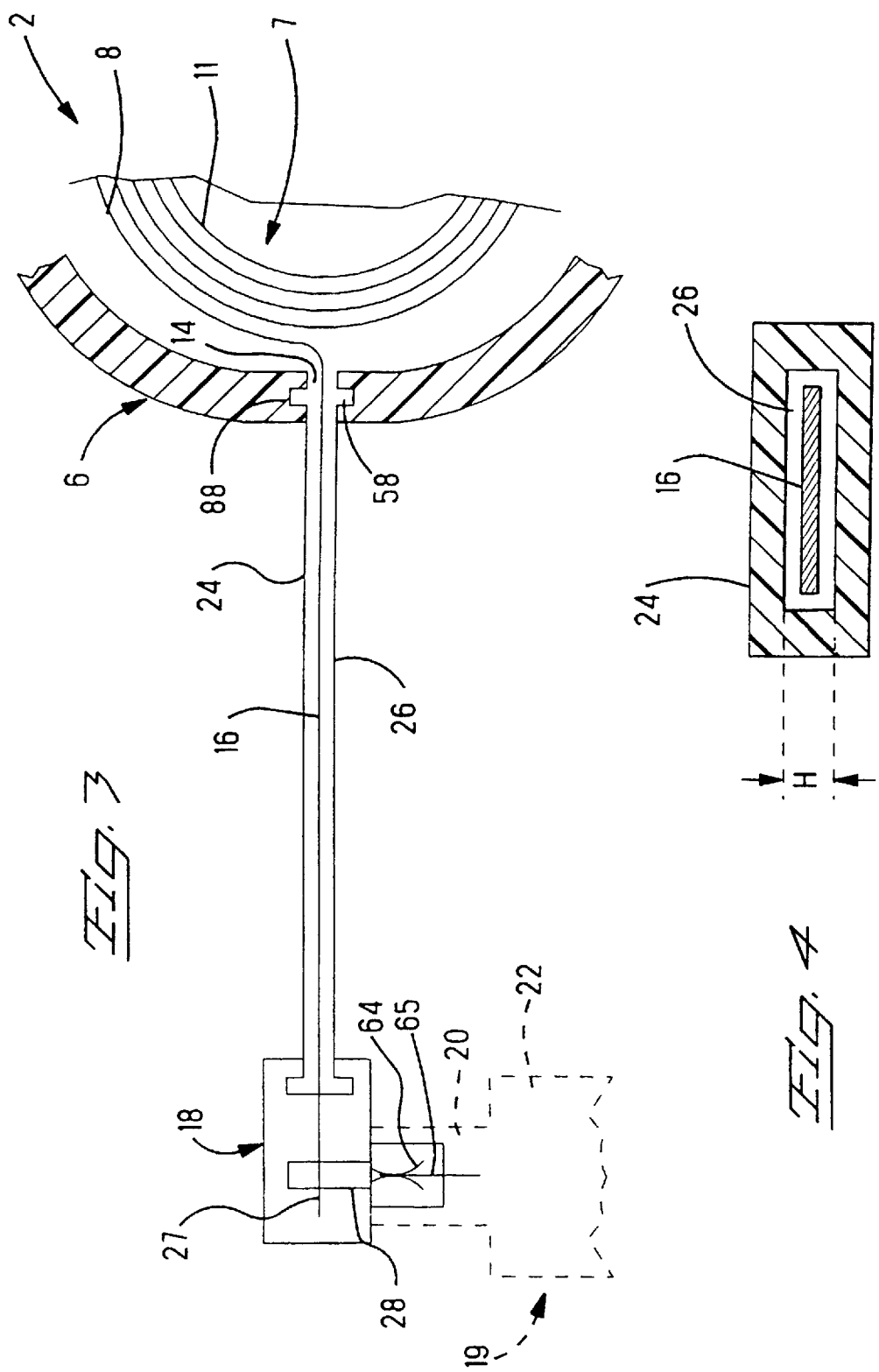

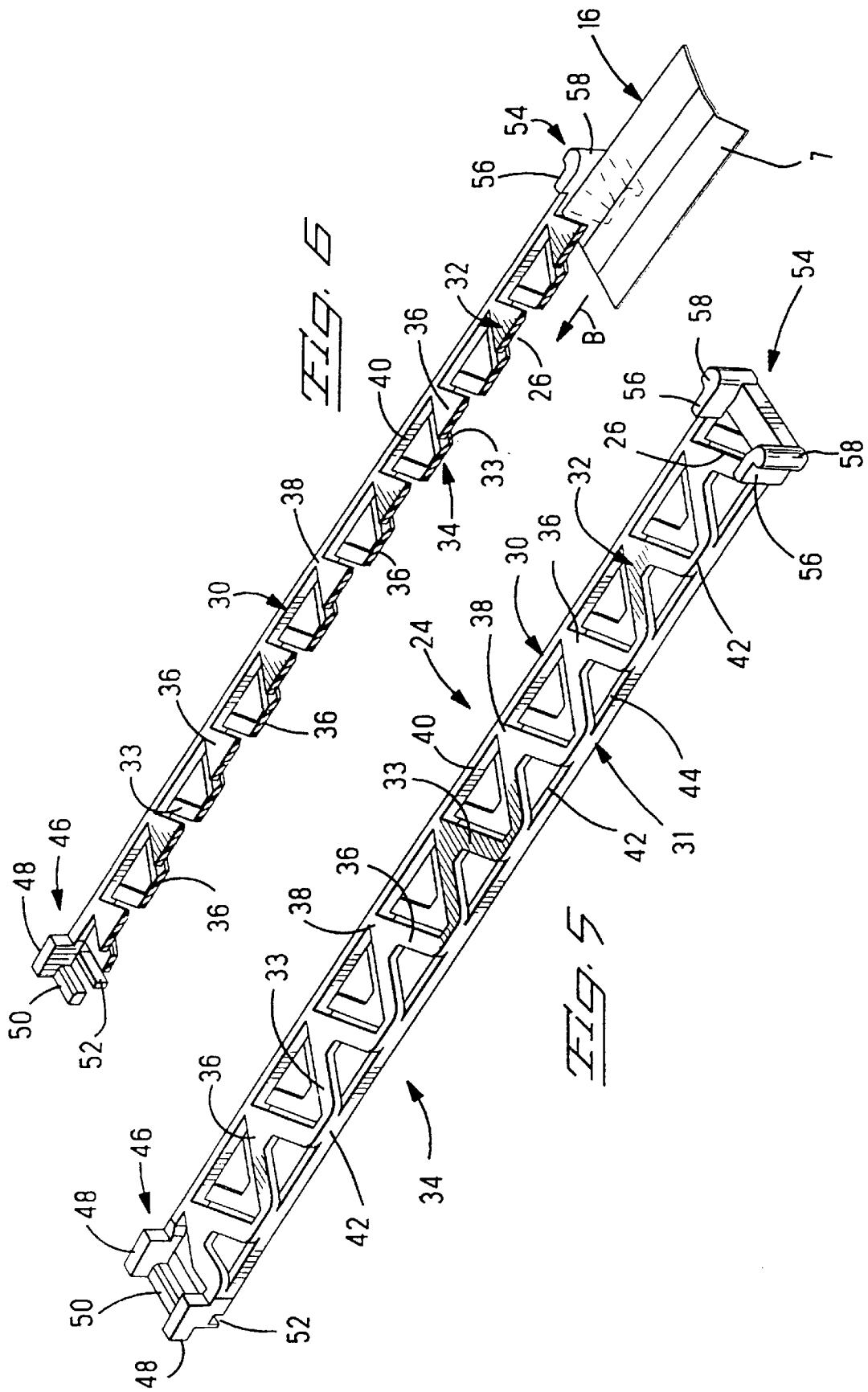

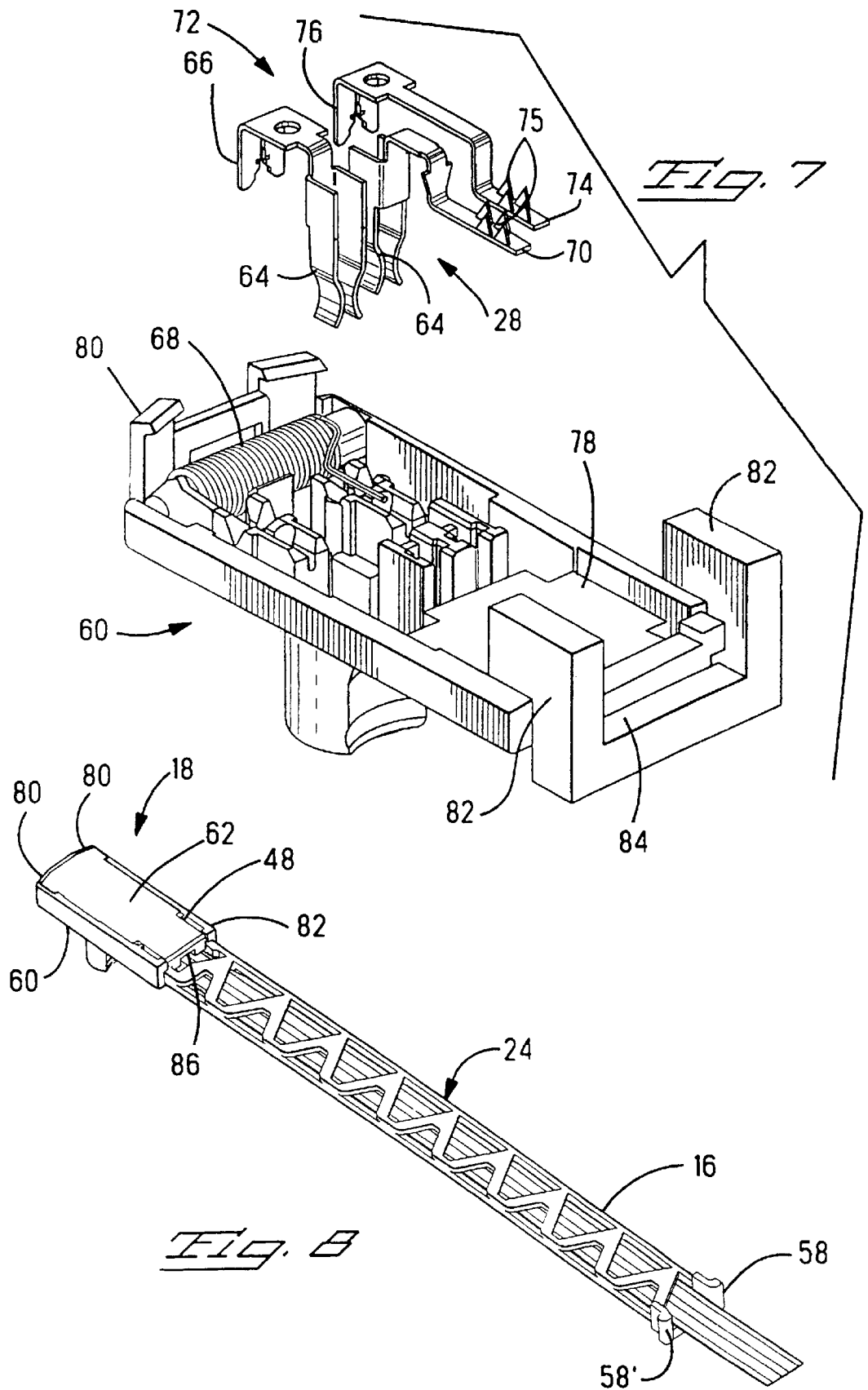

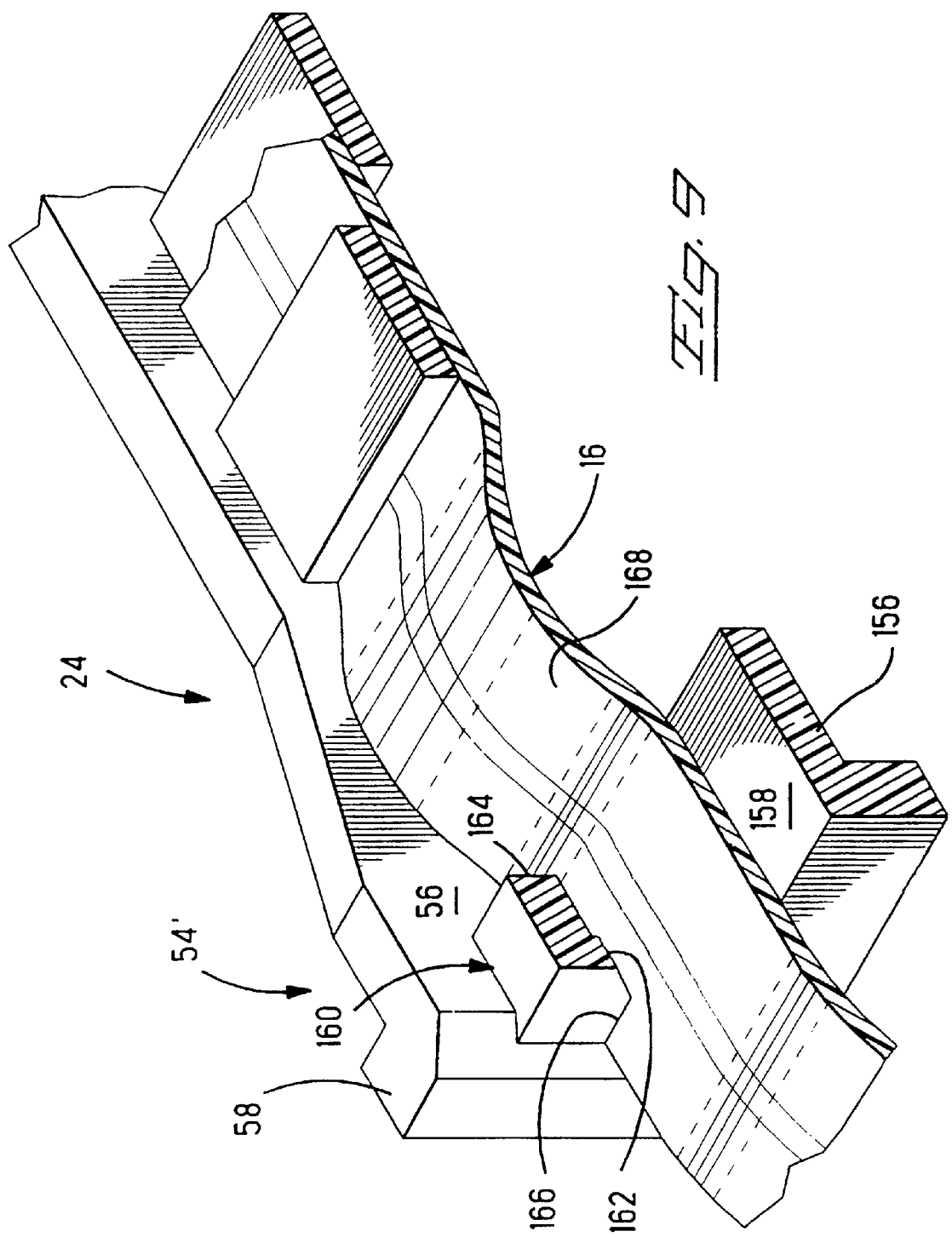

AIR BAG ACTIVATING SYSTEM AND A STRAIN RELIEF SLEEVE THEREFOR

BACKGROUND OF THE INVENTION

1. Field of the Invention

This invention relates to an air bag activating system and a strain relief sleeve therefor.

2. Summary of the Prior Art

The present invention concerns, in particular, an air bag activating system in a vehicle having a steering column with a fixed outer shaft containing a cassette which is rotatable with the steering wheel of the vehicle. The cassette contains an electrically actuable air bag activating assembly, a coil of multiconductor flat flexible cable being disposed between the cassette and the outer shaft of the steering column. The coil has a first lead portion connected to crash sensors outside the shaft and a second lead portion extending freely through an opening in the cassette. An electrical connector for mating with the air bag actuating assembly contains electrical terminals each connected to a respective conductor of the second lead portion. The coil of the flat flexible cable is coilable and uncoilable to compensate for the rotation of the steering wheel when the connector is mated with the air bag activating assembly.

According to a prior proposal, the second lead portion is provided with a strain relief sleeve moulded over the second lead portion and being therefore fixed thereto. It may, from time to time, be necessary for the connector to be unmated from the air bag activating assembly in order to allow testing of the crash sensors or, for example, the exchange of a gas generator cylinder of the assembly, for inflating the air bags. Under such circumstances, it may often occur that the connector is pulled in a direction away from the cassette with the risk of the connections between the cable conductors and the terminals of the connector, being impaired, given that the strain relief sleeve is fixed to the second lead portion. These connections will usually be crimped connections according to the teaching of U.S. Pat. No. 4,106,836, for example.

SUMMARY OF THE INVENTION

According to one aspect thereof, the present invention consists of an improvement in an air bag activating system in a vehicle having a steering column with a fixed outer shaft containing a cassette which is rotatable with the steering wheel of the vehicle, and an electrically actuable air bag activating assembly in the cassette, a coil of multi-conductor flat flexible cable between the cassette and the outer shaft having a first lead portion connected to crash sensors outside the shaft and a second lead portion extending freely through an opening in the cassette, an electrical connector for mating with the air bag activating assembly containing electrical terminals each connected to a respective conductor of the second lead portion, the coil of flat flexible cable being coilable and uncoilable to compensate for the rotation of the steering wheel when the connector is mated with said assembly, wherein a strain relief sleeve defining a passage through which a second lead extends is fixed at one end to the cassette and at its other end to the connector where a wave is formed in the second lead within the strain relief sleeve, the strain relief sleeve being stiffly extensible to absorb the load when the connector is pulled away from the cassette and the passage being dimensioned to allow the cable to pass freely therethrough, thereby to relieving the connections between the cable conductors and the terminals of the load when the connector is so pulled.

When the connector is pulled, therefore, cable is drawn to flatten the wave so that no pull is exerted on the connections between the cable conductors and the terminals.

In order to ensure freedom for the strain relief sleeve to stretch without pulling on the cable which would ultimately effect the contact terminations, the passage defined by the strain relief sleeve is preferably has twice the height of the cable thickness which will usually be about 0.25 mm. For economy of the material of the strain relief sleeve, which may, for example, be a soft nylon, the sleeve preferably comprises a pair of spaced, flat lattice structures formed integrally with a pair of spaced, parallel support strips, inner surfaces of the lattice structures and the support strips defining the passage of the strain relief sleeve, and serving to confine the flat flexible cable. Such a strain relief sleeve can readily be produced as a single injection moulded part, by means of a simple two part tool.

According another aspect thereof, the present invention consists in a one piece, folded, elongate, strain relief sleeve made of a stiffly resilient material, comprising a pair of spaced, parallel, longitudinally extending support strips connected together by a pair of spaced, longitudinally extending flat, parallel, lattice structures, each connected to both of said strips, the strips and the lattice structures cooperating to define a longitudinal through passage of elongate cross section for receiving with clearance, a length of flat flexible cable, attachment means being provided at each end of the sleeve, where when the strain relief sleeve is a natural position without stretching forces exerted thereupon the length of the flat flexible cable is greater than the length of the strain relief sleeve, whereby a wave is formed in the cable.

Preferably, each lattice structure comprises a series of V-shaped struts, apiece of the struts of each lattice structure being connected to the inner side of a respective one of the support strips and the legs of the struts of each lattice structure being connected to an edge of a respective other one of the support strips. The expansibility of the strain relief sleeve can be limited by connecting each leg of each V-shaped strut to a corresponding leg of an adjacent V-shaped strut, by means of a base formed integrally with the respective support strip. Since two lattice structures are arranged in rotational symmetry, each support strip is thereby of increased cross section.

BRIEF DESCRIPTION OF THE DRAWINGS

An embodiment of the present invention will now be described by way of example with reference to the accompanying drawings in which:

FIG. 3 is an enlarged fragmentary diagram showing a strain relief sleeve according to an embodiment of the invention, applied to the air bag activating system;

FIG. 4 is a diagrammatic cross sectional view through the strain relief sleeve;

FIG. 5 is an enlarged isometric view of the strain relief sleeve;

FIG. 6 is an enlarged isometric view of the strain relief sleeve in longitudinal section and showing a fragment of flat flexible cable;

FIG. 7 is an enlarged, exploded isometric view of the body of an electrical connector of the air bag actuating system;

FIG. 8 is an isometric view showing the connector body with a cover, the strain relief sleeve and the flat flexible cable assembled thereto, the strain relief sleeve being shown only diagrammatically;

FIG. 9 is a perspective and partially cutaway detail view of an attachment member used to connect the strain relief sleeve to a corresponding component.

DETAILED DESCRIPTION OF THE PREFERRED EMBODIMENT

Figure 1:
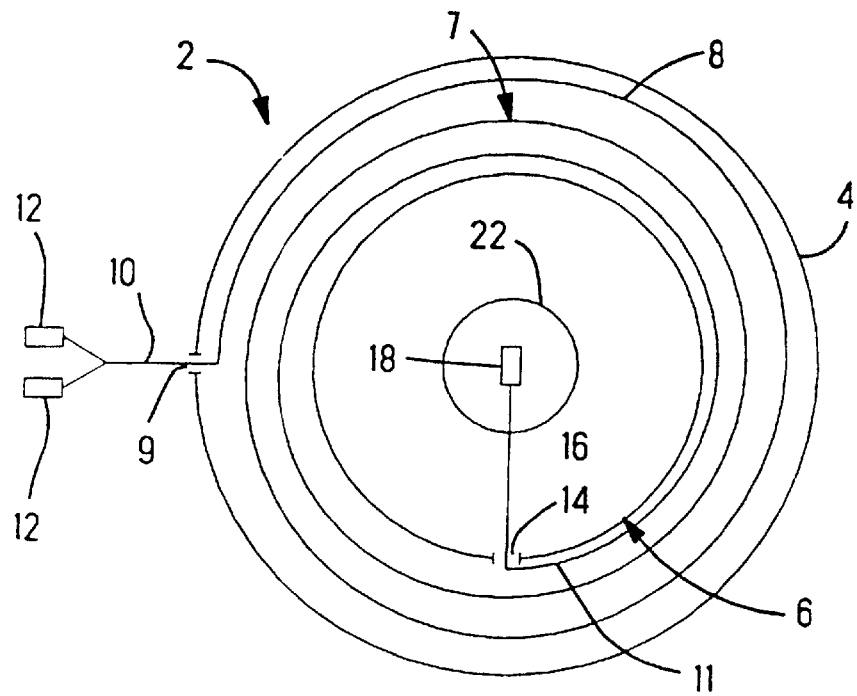
FIG. 1 is an explanatory diagram of an air bag activating system in an automotive vehicle, showing parts of the system in a first angular position of the steering wheel of the vehicle.
Figure 2:
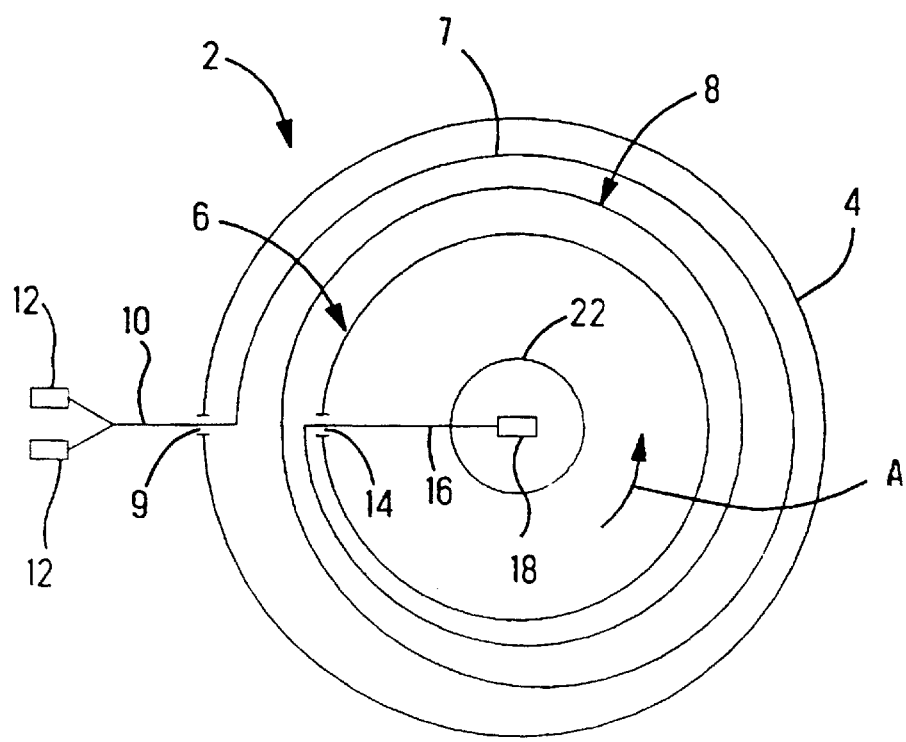
FIG. 2 is a similar view to that of FIG. 1 but showing the parts in a second angular position of the steering wheel.

As shown diagrammatically in FIGS. 1 and 2, a steering column 2 of an automotive vehicle comprises a fixed, radially outer shaft 4 clamped, for example, to the dash board of the vehicle, and a radially inner cassette 6 within the shaft 4 and which is rotatable with the steering wheel of the vehicle. Confined between the cassette 6 and the shaft 4 is a coil 8 of multi conductor flat flexible cable FFC 7. There extends from the radially outer end of the coil 8, through an opening 9 in the fixed shaft 4, a first lead portion 10 which is connected to crash sensors 12 in the forward part of the vehicle. There extends from the radially inner end 11 of the coil 7, through an opening 14 in the cassette 6, a second lead portion 16 which is connected at its radially inner end to terminals 28 (FIG. 3) of a first electrical connector 18 which is mated with a second electrical connector 20 (FIG. 3) of an electrically actuated, air bag activating assembly 19. The connector 20 is for supplying activating voltage from the sensors 12 to an electrically actuable device (not shown) for causing a gas generator cylinder 22 in the shaft 4 to supply inflating gas to air bags (not shown) for protecting the driver and the front seat passenger of the vehicle in the event of an accident thereto. As the cassette 6 is rotated with the steering wheel, the coil 8 of flat flexible cable FFC 7 simply coils or uncoils to compensate for the movement of the cassette, depending upon the direction of rotation of the steering wheel. FIGS. 1 and 2 illustrate the case where the cassette and thus the opening 14 are rotated through 90° in the direction of the arrow A in FIG. 2. As mentioned above, the outer shaft 4 is stationary and so does not rotate with the cassette 6.

It may, from time to time, be necessary for the connector 18 to be unmated from the connector 20 on the cylinder 22, in order, for example, to allow testing of the sensors 12 or the cylinder 22 to be exchanged. When such work is being carried out there is the danger of the connector 18 being pulled, tightening up the coil 8 so that the connections 27 between the conductors of the cable and the terminals 28 of the connector 18 are impaired. These connections will usually be crimped connections according to the teaching of U.S. Pat. No. 4,106,836, for example, which are described below. As shown in FIG. 3, this disadvantage is avoided according to the present embodiment, by providing a strain relief sleeve 24 anchored at one end to the connector 18 and at its opposite end to the cassette 6. The strain relief sleeve 24 defines a through passage 26 which is substantially oversized relative to the flat flexible cable FFC of the lead portion 16, the height H of the passage 26 being preferably about twice the thickness of the cable FFC, that is to say about 0.50 mm, the thickness of the cable being 0.25 mm. In any event, relative axial movement between the cable and the sleeve 24 must be free. When the connector 18 is pulled in any direction, away from the cassette 6, the strain relief sleeve 24 elongates longitudinally, but only slightly, to absorb the load, and the flat flexible cable is free to move therein, as will be described with reference to FIG. 9, to compensate for its elongation. Thus the connections 27 between the terminals 28 of the connector 18 and the conductors of the lead portion 16 are relieved of load despite the connector 18 being pulled away from the cassette 6.

The strain relieve sleeve 24 will now be described in detail with reference to FIGS. 5 and 6. The sleeve 24 is an elongate, one piece, injection moulding of a stiffly resilient plastics material, for example, a soft nylon and can be produced by means of a simple two part tool. The strain relief sleeve 24 comprises a pair of longitudinally extending, rectangular cross section support strips 30 and 31, respectively, which are parallel to one another. The strips 30 and 31 are spanned throughout their length by a pair of opposed, parallel, spaced lattice structures 32 and 34, respectively, arranged in rotational symmetry. The passage 26, which is of elongate rectangular cross section is defined by the spacing between the support strips 30 and 31 and the lattice structures 32 and 34. Each lattice structure 32 and 34 comprises a series of V-shaped struts 36. The apiece 38 of the struts 36 of the lattice structure 32 are connected to the strip 30, being formed integrally with the inner side 40 of the strip 30. The apiece (not shown) of the struts 36 of the lattice structure 34 are similarly integrally formed with the inner side of the strip 31. The end, remote from the apex, of each leg 33 of each V-shaped strut is connected to a corresponding leg of the next adjacent V-shaped strut by a common base 42. The bases 42 of the struts 36 of the lattice structure 32 are formed integrally with the proximate upper edge 44 of the strip 31, the bases 42 of the struts of the lattice structure 34 similarly being formed integrally with proximate bottom edge of the strip 30. Since the lattice structures 32 and 34 are arranged in rotational symmetry, each of the strips 30 and 31 is in effect reinforced by the bases 34 which limits the extensibility of the strain relief sleeve 24.

At the left hand end (as seen in FIGS. 5 and 6), that is to say the connector end, of the strain relief sleeve 24, is an attachment member 46 comprising parallel cheeks 48 each formed integrally with a respective one of the support strips 30 and 31 and being spanned by a cross piece 50. Beneath the cross piece 50 the attachment member 46 defines a latching groove 52 extending transversely of the length of the sleeve 24. At its right hand end (as seen in FIGS. 5 and 6), the sleeve 24 is formed with an attachment member 54 comprising a pair of parallel cheeks 56 having at their free ends rounded dowels extending at right angles to the planes of the flat lattice structures.

With further reference to FIG. 9, the attachment end 54 is now described in greater detail. The attachment member 54 includes a support span 156 that interconnects the parallel cheeks 56. The support span 156 includes an upper surface 158 upon which the flat flexible cable portion 16 rides. An anchor post 160 extends outward from one of the parallel cheeks 56 and the upper surface 158 of the support span 156. The anchor post 160 includes a post portion 162 and an overlying cap portion 164 that extends thereover in an L-shaped manner whereby a notch 166 formed in the FFC 16 enables the FFC 16 to be anchored to the strain relief sleeve 24 at the attachment member 54. Provided that the FFC lead portion 16 is longer than the strain relief sleeve 24 therealong a wave 168 can be formed in the FFC lead portion 16 between the two parallel cheeks 56. This wave 168 represents excess cable length that may be taken up in response to the stretching of the sleeve 24 without the exertion of a force on the contact crimps described blow. In addition, it may be advantageous to have the upper surface 148 located offset from the passage 26 such that the FFC 16 is easily insertable along the passage 26 so that the FFC 16 passes over the anchor post 160 without having to be deflected and is then buckled slightly both to form the wave 168 and so that the notch 166 fits under the cap portion 164 and about the post portion 162.

As shown in FIGS. 7 and 8, the connector 18 comprises an insulating housing body 60 and a cover 62 therefor. The terminals 28 of the connector 18 comprise receptacles 64 for mating with pins 65 (FIG. 3) of the connector 20. One of the receptacles 64 has a slotted plate contact 66 for receiving one end of the coil of a smoothing choke 68, the other of the receptacles 64 having a crimping contact 70 for crimping about a conductor of the lead portion 16 of the flat flexible cable. A further terminal 72 comprises a similar crimping contact 74 and a slotted plate contact 76 for receiving the other end of the choke coil. The contacts 70 and 74 have pointed lances 75 for insertion through the insulation of the cable and for crimping down to engage the cable conductors, according to the teaching for example, U.S. Pat. No. 4,106, 836.

The housing body 60 has cavities for receiving the respective terminals, a flat platform 78 for supporting the contacts 70 and 74, a pair of clips 80 for latching to the cover 62 and a pair of forward cheeks 82 spanned by a bar 84 for latching engagement in the groove 52 of the attachment member 46 of the sleeve 24. The cover 62 has a cable engaging lip 86. The flat platform 78 enabling the connector 18 to be terminated to the cable when the contacts are set in the housing 60, thereby allowing the connectors 19 to be delivered in partially assembled form and not requiring special tooling to terminate the cable.

The choke coil 68 is first assembled to the housing body 60, after which the terminals 28 and 72 are assembled to the housing body 60. The leading end of the lead portion 16 is passed through the passage 26 from the cassette end of the strain relief sleeve 24 as indicated by the arrow B in FIG. 6, until the free leading end portion of the lead portion 16, after passing under the cross piece 50 projects from the connector end of the strain relief sleeve 24. The connector end of the sleeve 24 is then lowered into the forward end of the housing body 60 so that the bar 18 thereof is received in the groove 52 of the attachment member 46, with the projecting end part of the lead portion 16 lying on the lances 75 of the contacts 70 and 74. The lances 75 are then crimped down to complete the connections between the conductors of the lead portion 16 and their respective terminals. The cover 62 is then latched to the housing body 60 with the lip 86 disposed between the cheeks 82 and pressing the end part of the lead portion 16 down against the bar 84 with the cheeks 48 between the cheeks 82 as shown in FIG. 8. The connector end of the strain relief sleeve 24 and the lead portion 16 are thereby fixedly secured to the connector 18. The cassette end of the strain relief sleeve 24 is then fixed to the cassette 6 by engagement of the dowels 58 in recesses 88 communicating with the opening 14 (FIG. 3) whereby the assembly of the strain relief sleeve to the connector 18 and the cassette 6 is completed.

We claim:

1. A connection system for an air bag activating system comprising: a connector for connection to a first component; a cable terminated by the connector and extending from a housing of a second component; a strain relief having a first end fixed to the connector, a second end fixable to the second component and a strain relief sleeve having a passage extending therebetween, the cable being positioned in the passage; the connection system being characterized in that; the passage is dimensioned so that the cable passes freely therein; the strain relief sleeve is stiffly expansible to absorb any load imposed as a result of displacing the connector relative to the second component, where an anchor post that extends into the passage is formed towards the second end of the strain relief a first distance along the strain relief from the connector and the cable includes a notch complementary to the post a second distance along the cable from the connector to the notch that is longer than the first distance, such that when the cable is anchored along the strain relief by the notch being engaged with the anchor post a wave is formed in the cable that is equal to the difference of the two distances so that as the strain relief sleeve expands, due to a strain being exerted thereupon, the wave flattens, thereby providing necessary excess cable to prevent strain at the connector.

2. The connection system of claim 1 wherein the strain relief sleeve is formed of overlying lattice structures.

3. The connection system of claim 2 wherein the cable is a flat flexible cable.

4. An air bag activating system in a vehicle having a steering column with a fixed outer shaft containing a cassette which is rotatable with the steering wheel of the vehicle and an electrically actuable air bag activating assembly in the cassette, a coil of multi-conductor flat flexible cable between the cassette and the outer shaft having a first lead portion connected to crash sensors outside the shaft and a second lead portion extending freely through an opening in the cassette, an electrical connector for mating with the air bag activating assembly, containing electrical terminals each connected to a respective conductor of the second lead portion, the coil of flat flexible cable being coilable and uncoilable to compensate for the rotation of the steering wheel when the connector is mated with said assembly, wherein a strain relief sleeve defining a passage through which the second lead portion extends is fixed at one end to the cassette and at its other end to the connector, the strain relief sleeve being stiffly expansible to absorb the load when the connector is pulled away from the cassette and the passage being dimensioned to allow the cable to pass freely therethrough thereby to relieve the connections between the cable conductors and the terminals, of load, when the connector is so pulled, where the strain relief sleeve includes an anchor post that extends into the passage is formed towards the cassette end of the strain relief a first distance along the strain relief from the connector and the cable includes a notch complementary to the post a second distance along the cable from the connector to the notch that is longer than the first distance, such that when the cable is anchored along the strain relief by the notch being engaged with the anchor post a wave is formed in the cable that is equal to the difference of the two distances so that as the strain relief sleeve expands, due to a strain being exerted thereupon, the wave flattens, thereby providing necessary excess cable to prevent strain at the connector.

* * * * *